US012676531B2

(12) United States Patent  
Kuroiwa

(10) Patent No.: US 12,676,531 B2  
(45) Date of Patent: Jul. 7, 2026

(54) FLUID SUPPLY DEVICE WITH AN ELASTIC MEMBER HAVING HIGH DURABILITY

(71) Applicant: Hitachi Astemo, Ltd., Hitachinaka (JP)

(72) Inventor: Naoya Kuroiwa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 355 days.

(21) Appl. No.: 18/448,841

(22) Filed: Aug. 11, 2023

(65) Prior Publication Data

US 2023/0396122 A1 Dec. 7, 2023

Related U.S. Application Data

(63) Continuation of application No. PCT/JP2021/013514, filed on Mar. 30, 2021.

(51) Int. Cl.  
*H02K 5/24* (2006.01)

(52) U.S. Cl.  
CPC ..................................... *H02K 5/24* (2013.01)

(58) Field of Classification Search  
CPC .. H02K 5/15; H02K 5/24; F04B 17/03; F04B 53/001; F04B 53/003  
See application file for complete search history.

(56) References Cited

U.S. PATENT DOCUMENTS 3,179,058 A * 4/1965 Meagher ............... F04D 29/426  
D15/7  
5,639,228 A 6/1997 Van De Venne et al.

2010/0290933 A1* 11/2010 Tabata ................ F04C 15/0042  
417/410.3  
2020/0309215 A1* 10/2020 Usui ........................ F16D 65/09  
2021/0265892 A1* 8/2021 Shimizu ................... H02K 5/24

FOREIGN PATENT DOCUMENTS

| JP | S6321786 U | * | 2/1988 |
| JP | H03125929 U | | 12/1991 |
| JP | 6799721 B1 | | 12/2020 |

OTHER PUBLICATIONS

Machine Translation of JP6321786, Feb. 1988 (Year: 1988).*  
International Search Report mailed on Jun. 8, 2021 for the corresponding PCT International Patent Application No. PCT/JP2021/013514 (2 pages including English translation).

* cited by examiner

*Primary Examiner* — Eric Johnson  
(74) *Attorney, Agent, or Firm* — Leason Ellis LLP; Edward J. Ellis; Melvin C. Garner

(57) ABSTRACT

A fluid supply device includes an electric motor, an exterior case, a fixing member, a harness, a lid which includes a holding portion, and a stopper. An elastic member, which has annular-shaped, is disposed in a compressed manner between the outer circumferential surface of the electric motor and the inner circumferential surface of the exterior case. The elastic member is compressed to apply a restoring force to the electric motor in a radial direction of the electric motor, and apply a restoring force to the holding portion of the lid.

8 Claims, 5 Drawing Sheets

FLUID SUPPLY DEVICE WITH AN ELASTIC MEMBER HAVING HIGH DURABILITY

CROSS-REFERENCE TO RELATED APPLICATIONS

This application is a Continuation of International Patent Application No. PCT/JP2021/013514 filed on Mar. 30, 2021, the content of which is incorporated herein by reference.

FIELD OF THE INVENTION

The present disclosure relates to a fluid supply device configured to supply a fluid to the outside.

BACKGROUND OF THE INVENTION

A saddle-ride type vehicle such as a two-wheeled motor vehicle or a three-wheeled motor vehicle includes a swing arm extending rearward from a vehicle body and capable of swinging in an up-down direction, and a rear wheel rotatably supported by the swing arm. A rear suspension stretches from a rear portion of the vehicle body to the swing arm.

The rear suspension includes a suspension spring which absorbs an impact applied to the rear wheel from a road surface or the like. When an initial load (pre-load) applied to the suspension spring is changed, a vehicle height of the two-wheeled vehicle can be adjusted. Japanese Patent No. 6799721 discloses a related-art technique regarding a vehicle height adjustment device configured to adjust a vehicle height of a two-wheeled vehicle.

The vehicle height adjustment device disclosed in Japanese Patent No. 6799721 includes a hydraulic jack mechanism capable of adjusting a length of a suspension spring using hydraulic pressure, and a fluid supply device configured to supply oil (fluid) to the hydraulic jack mechanism.

The fluid supply device includes an electric motor serving as a driving source for supplying the oil to the outside, and a cylindrical exterior case configured to accommodate the electric motor. The electric motor includes a harness extending outward of the exterior case.

Japanese Patent No. 6799721 does not disclose fixing the electric motor in the exterior case. Hereinafter, a method of fixing the electric motor will be discussed. The electric motor is disposed at an end portion of the exterior case. Therefore, it is conceivable to use a lid which closes the end portion of the exterior case. For example, a tubular portion is formed in the lid and a harness side of the electric motor is fitted to the tubular portion, thereby holding the electric motor. Further, the harness is passed through the lid so that the harness is supported by the lid.

When the lid is fitted to an inner circumferential surface of the exterior case, it is assumed that the lid may rotate about an axis of the electric motor with respect to the inner circumferential surface of the exterior case. Since the lid supports the harness, when the lid rotates, the harness is twisted, and a load is applied to a connection portion between the harness and the electric motor.

Further, since there is a dimensional tolerance for the lid, it is assumed that, in the lid, a gap is formed between the lid and the inner circumferential surface of the exterior case. When the lid rattles with respect to the exterior case due to traveling of the two-wheeled vehicle, vibration of an engine, or the like, vibration is applied to the electric motor held by the lid, and the vibration becomes a load of the electric motor.

Since the rotation of the lid and the rattling of the electric motor in a radial direction can be prevented in the fluid supply device in which the lid holds the electric motor, durability of the fluid supply device can be improved.

SUMMARY OF THE INVENTION

An object of the present disclosure is to provide a fluid supply device having high durability.

As a result of earnest studies, the present inventors have found that, since an annular elastic member is disposed in a compressed manner between an outer circumferential surface of the electric motor and the inner circumferential surface of the exterior case, a restoring force of the elastic member acts upon the electric motor in the radial direction of the electric motor. Accordingly, rattling of the electric motor in the radial direction can be prevented. Further, it has been found that the restoring force of the elastic member also acts upon a holding portion of the lid. It is possible to prevent the lid from rotating about the axis of the electric motor. The durability of the fluid supply device can be improved.

According to the present disclosure, a fluid supply device is provided including: an electric motor serving as a driving source for supplying a fluid to an outside: a exterior case having a cylindrical shape and configured to accommodate the electric motor: a fixing member configured to fix the electric motor to be able to prevent movement of the electric motor in an axial direction of the electric motor inside the exterior case: a harness connected to the electric motor and configured to supply electricity: a lid which is fitted to an inner circumferential surface of the exterior case to close an end portion of the exterior case, supports the harness extending from the electric motor to an outer side of the exterior case, and includes a holding portion having a cylindrical shape an holding an outer circumferential surface of the electric motor over a circumference thereof; and a stopper configured to prevent coming-off of the lid from the exterior case, in which: an elastic member, which has an annular shape, is disposed in a compressed manner between the outer circumferential surface of the electric motor and the inner circumferential surface of the exterior case; and the elastic member is compressed to apply a restoring force to the electric motor in a radial direction of the electric motor, and apply a restoring force to the holding portion of the lid.

The outer circumferential surface of the electric motor, the inner circumferential surface of the exterior case, and an end surface of the holding portion of the lid may compress the elastic member.

The elastic member may be the lid made of an elastic material.

An outer circumferential surface of the holding portion of the lid and the inner circumferential surface of the exterior case may compress the elastic member, and the elastic member may apply, to the holding portion of the lid, a force in a direction of reducing a diameter of the holding portion.

Further, the stopper may be configured integrally with the lid body.

A seal member may be disposed to close a gap between the harness and the lid.

According to the present disclosure, a fluid supply device having high durability can be provided.

BRIEF DESCRIPTION OF THE DRAWING

FIG. 2 is a schematic view of a vehicle height adjustment device including the fluid supply device illustrated in FIG. 1.

FIG. 3 is a diagram illustrating a configuration for holding an electric motor in the fluid supply device illustrated in FIG. 2.

FIG. 4 is a diagram illustrating a configuration for holding an electric motor in a fluid supply device according to a second embodiment.

FIG. 5 is a diagram illustrating a configuration for holding an electric motor in a fluid supply device according to a third embodiment.

DETAILED DESCRIPTION OF THE INVENTION

Figure 1:
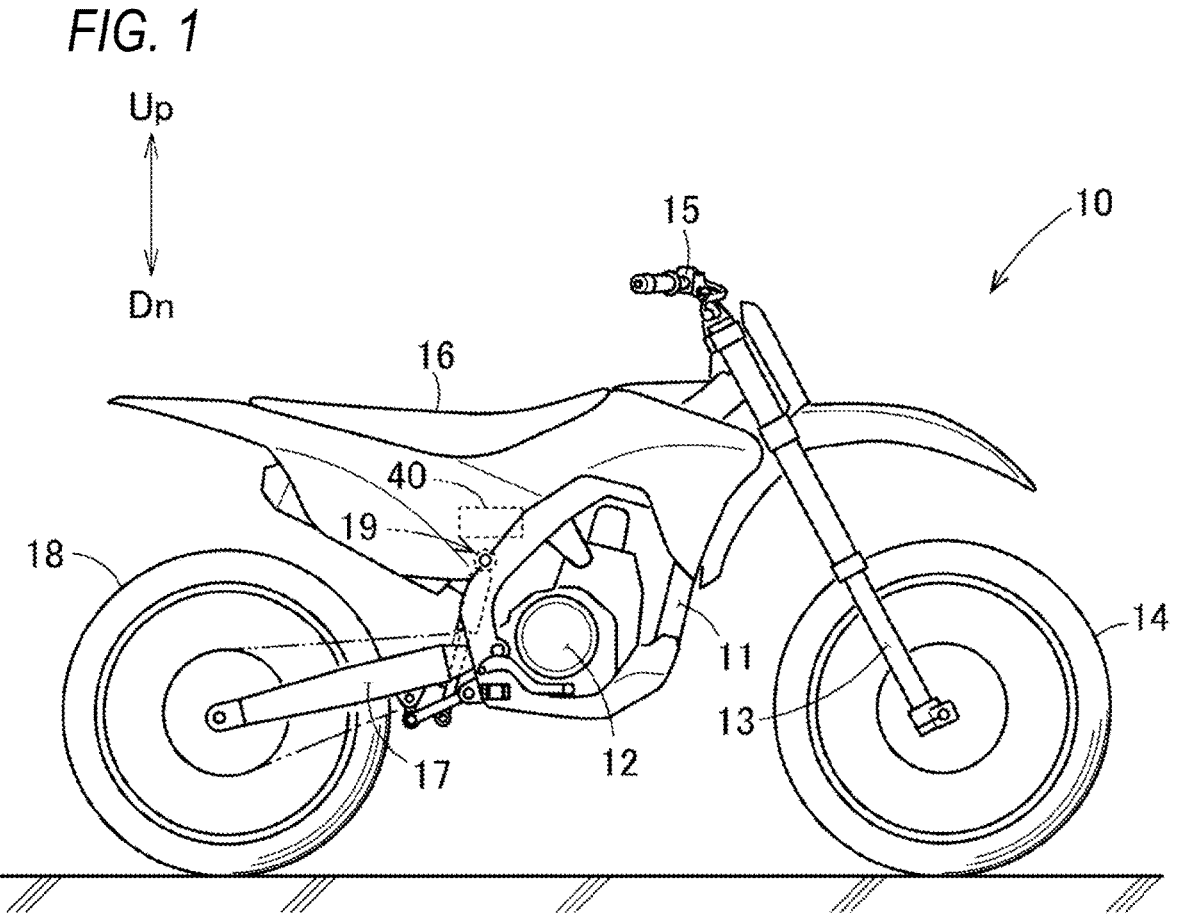
FIG. 1 is a side view of a two-wheeled motor vehicle including a fluid supply device according to a first embodiment.

Embodiments of the present disclosure will be described below with reference to the accompanying drawings.

First Embodiment

FIG. 1 illustrates a saddle-ride type vehicle, for example, an off-road type two-wheeled vehicle 10. The two-wheeled vehicle 10 includes a vehicle body 11, an engine 12 which is a power source supported at a central lower portion of the vehicle body 11, left and right front forks 13 (only the front fork 13 on a right side is illustrated in the drawing) which are provided on the left and right of a front portion of the vehicle body 11 and absorb an impact received from unevenness of a road surface, a front wheel 14 which is sandwiched and rotatably supported by the front forks 13, a handlebar pipe 15 which is disposed on an upper portion of the front forks 13 and steers the front wheel 14, a seat 16 which is provided above the engine 12 for an occupant to sit, a swing arm 17 which extends rearward from a rear portion of the vehicle body 11 and is swingable in an up-down direction, a rear wheel 18 which is rotatably supported by the swing arm 17, and left and right rear suspensions 19 (only the rear suspension 19 on the right side is illustrated in the drawing) which stretch from the rear portion of the vehicle body 11 to the swing arm 17.

Figure 2:
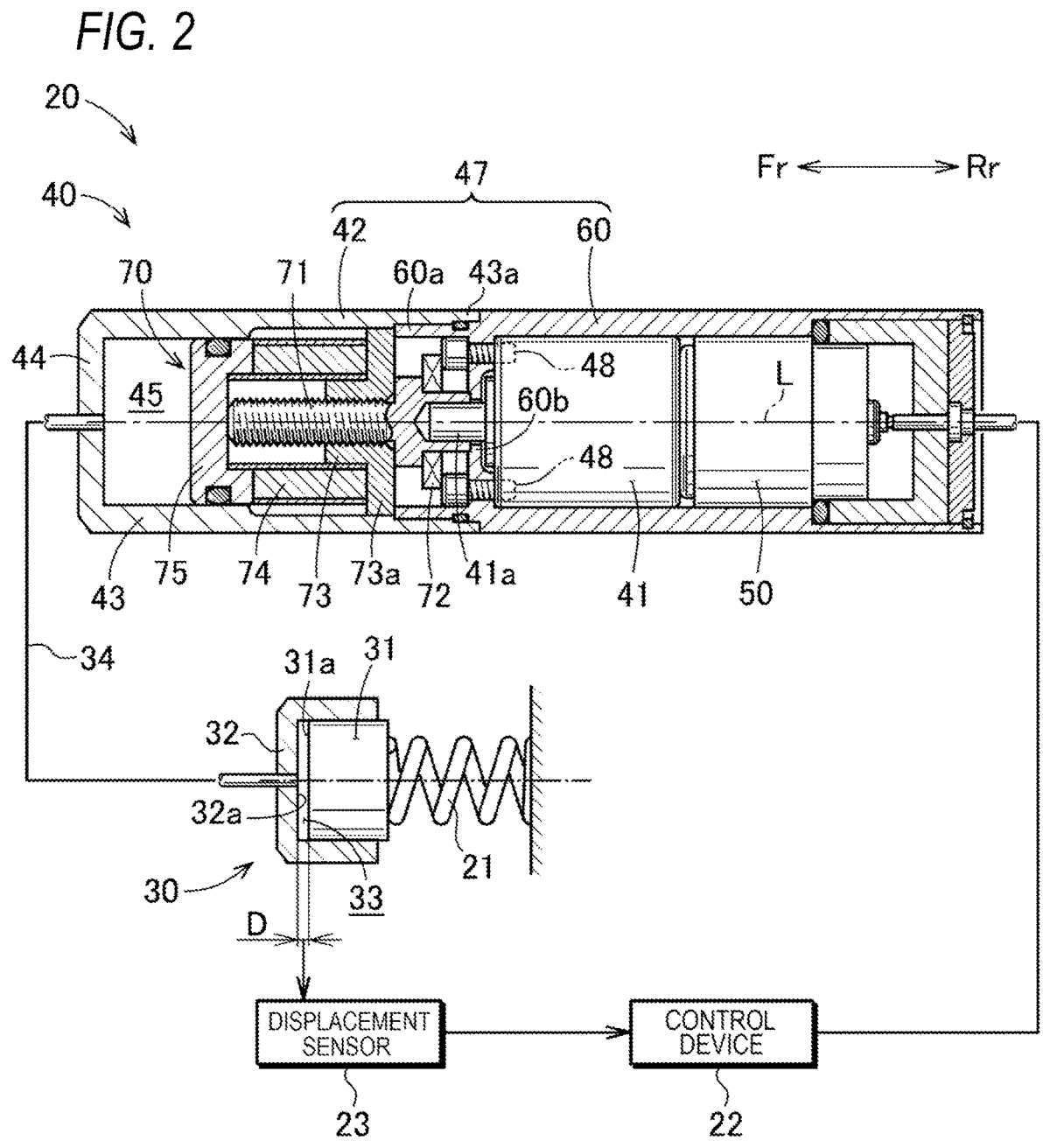

FIGS. 1 and 2 will be referred to. The rear suspension 19 includes a spring 21 which is a compression coil spring which absorbs an impact applied to the rear wheel from a road surface or the like. A vehicle height of the two-wheeled vehicle 10 can be adjusted by changing an initial load (pre-load) applied to the spring 21. Hereinafter, a vehicle height adjustment device 20 which adjusts the vehicle height of the two-wheeled vehicle 10 will be described.

The vehicle height adjustment device 20 includes a hydraulic jack mechanism 30 capable of adjusting a length of the spring 21 by using hydraulic pressure, a fluid supply device 40 configured to supply oil (a fluid) to the hydraulic jack mechanism 30, and a control device 22 capable of controlling the fluid supply device 40.

The hydraulic jack mechanism 30 includes a support member 31 configured to support an end portion of the spring 21 on a vehicle body side, and an accommodating member 32 configured to accommodate the support member 31. A space including a bottom surface 32a of the accommodating member 32 serves as an oil chamber 33 in which oil is stored.

The support member 31 is movable in a length direction of the spring 21. The length of the spring 21 is adjusted by a movement amount of the support member 31 in the hydraulic jack mechanism 30. The movement amount is, for example, an interval D between the bottom surface 32a of the accommodating member 32 and a facing surface 31a of the support member 31 facing the bottom surface 32a. A displacement sensor 23 detects the interval D and sends a signal to the control device 22.

(Fluid Supply Device)

The fluid supply device 40 includes an electric motor 50 which serves as a driving source for supplying oil to the outside, a speed reducer 41 which reduces a rotational speed of the electric motor 50, a cylindrical first cylinder 60 which accommodates the electric motor 50 and the speed reducer 41, a push-out mechanism 70 which is driven by the speed reducer 41 to push out oil to the outside, and a cylindrical second cylinder 42 which accommodates the push-out mechanism 70.

For convenience of description, a direction in which an axis L of the electric motor 50 extends is defined as an axial direction. Of the axial direction, a second cylinder 42 side is defined as a front side Fr, and a first cylinder 60 side is defined as a rear side Rr.

(Exterior Case)

Both front and rear ends of the first cylinder 60 are open. The second cylinder 42 is a bottomed cylindrical member in which a bottom portion 44 and a cylindrical portion 43 are integrally formed. A rear end portion 43a of the cylindrical portion 43 of the second cylinder 42 is open. A front end portion 60a of the first cylinder 60 is inserted into the rear end portion 43a of the second cylinder 42. The first cylinder 60 and the second cylinder 42 coupled in the axial direction (front-rear direction) constitute an exterior case 47.

(Push-Out Mechanism)

The push-out mechanism 70 includes a rotatable shaft member 71 fixed to an output shaft 41a of the speed reducer 41, a bearing 72 rotatably supporting the shaft member 71, a nut 73 attached to an outer circumferential surface of the shaft member 71, a moving member 74 which surrounds the shaft member 71 and which moves together with the nut 73 due to being pressed by a flange 73a of the nut 73, and a piston 75 fixed to a tip end of the moving member 74. The outer circumferential surface of the shaft member 71 includes a male screw. An inner circumferential surface of the nut 73 includes a female screw engaged with the female screw of the shaft member 71. A collar is attached to each of an inner circumferential surface and an outer circumferential surface of the moving member 74.

The bottom portion 44 of the second cylinder 42, the cylindrical portion 43 of the second cylinder 42, and the piston 75 define an oil chamber 45. A hose 34 is inserted into a hole formed in the bottom portion 44 of the second cylinder 42. The hose 34 communicates the oil chamber 45 of the second cylinder 42 with the oil chamber 33 of the hydraulic jack mechanism 30.

(Operation of Fluid Supply Device)

When the control device 22 drives the electric motor 50 of the fluid supply device 40, the shaft member 71 rotates via the speed reducer 41, and the nut 73 moves forward. When the nut 73 moves, the flange 73a of the nut 73 pushes the moving member 74, and the piston 75 fixed to a front end of the moving member 74 moves forward. Oil in the second cylinder 42 is supplied to the oil chamber 33 of the hydraulic jack mechanism 30 via the hose 34. Since the support member 31 moves in a direction away from the bottom surface 32a of the accommodating member 32 due to pressure of the oil, the length of the spring 21 is reduced.

(First Cylinder)

The first cylinder 60 includes a fixing portion 60b for fixing the speed reducer 41 to the first cylinder 60. The speed reducer 41 is screwed to the fixing portion 60b with screws 48 and 48. The output shaft 41a of the speed reducer 41 penetrates the fixing portion 60b.

Figure 3:
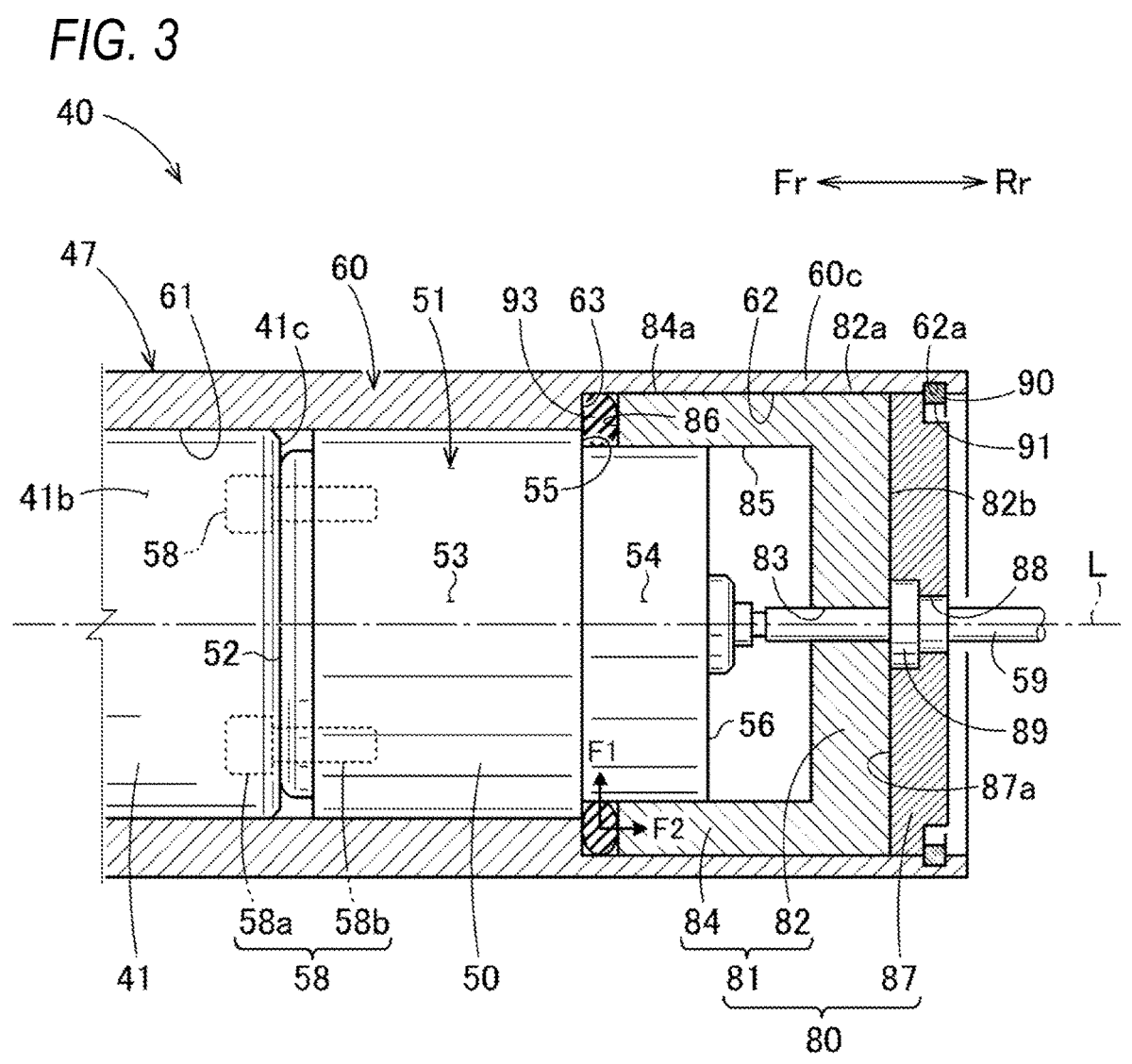

FIG. 3 will be referred to. The speed reducer 41 and the electric motor 50 are held by an inner circumferential surface of the first cylinder 60 (movement of the electric motor 50 in a radial direction is restricted). The first cylinder 60 includes a first inner circumferential surface 61 which is in contact with an outer circumferential surface 41b of the speed reducer 41, a second inner circumferential surface 62 (an inner circumferential surface of the exterior case) which is located rearward of the first inner circumferential surface 61 and has a diameter larger than that of the first inner circumferential surface 61, and a first step surface 63 which connects the first inner circumferential surface 61 and the second inner circumferential surface 62.

(Electric Motor)

The electric motor 50 is, for example, a direct-current (DC) motor with a brush. The electric motor 50 includes a case 51 which accommodates a coil (not illustrated) therein. The case 51 includes a contact surface 52 which is in contact with a rear end surface 41c of the speed reducer 41, a first outer circumferential surface 53 which is in contact with the first inner circumferential surface 61 of the first cylinder 60 over a circumference thereof, a second outer circumferential surface 54 which is located rearward of the first outer circumferential surface 53 and has a smaller diameter than the first outer circumferential surface 53, and a second step surface 55 which connects the first outer circumferential surface 53 and the second outer circumferential surface 54. The second step surface 55 of the case 51 and the first step surface 63 of the first cylinder 60 are located on the same plane. The second step surface 55 and the first step surface 63 face rearward.

(Fixing Member)

The electric motor 50 is fixed inside the first cylinder 60 by screws 58 and 58 (fixing members). A head portion 58a of each screw is located inside the speed reducer 41. A shaft portion 58b of each screw extends in the axial direction and penetrates the rear end surface 41c of the speed reducer 41 and the contact surface 52 of the electric motor 50. The shaft portion 58b is screwed to the electric motor 50. The electric motor 50 may be fixed such that movement of the electric motor 50 in the axial direction can be prevented. For example, the electric motor 50 may be directly fixed to the first cylinder 60.

(Harness)

A harness 59 for supplying electricity to the electric motor 50 is connected to the electric motor 50. The harness 59 extends from a rear end surface 56 of the case 51 of the electric motor 50 to the outside of the first cylinder 60.

(Lid)

A lid 80 is fitted to the second inner circumferential surface 62 of the first cylinder 60. The lid 80 closes a rear end portion 60c of the first cylinder 60 (a side where the harness 59 extends). The lid 80 includes an inner lid 81 disposed in a manner of holding the case 51, and an outer lid 87 covering the inner lid 81. Both the inner lid 81 and the outer lid 87 are made of resin. The inner lid 81 and the outer lid 87 are separate bodies, but may be integrally formed.

The inner lid 81 includes a main body portion 82 having a circular plate shape centered on the axis L, and a cylindrical holding portion 84 which extends from an outer circumferential edge of the main body portion 82 toward an electric motor 50 side (front side) and holds the electric motor 50. The main body portion 82 and the holding portion 84 are integrally formed. An outer circumferential surface 82a of the main body portion 82 is in contact with the second inner circumferential surface 62 of the first cylinder 60 over a circumference thereof.

An outer circumferential surface 84a of the holding portion 84 is in contact with the second inner circumferential surface 62 of the first cylinder 60 over a circumference thereof. An inner circumferential surface 85 of the holding portion 84 is in contact with the second outer circumferential surface 54 of the electric motor 50 over a circumference thereof. Regarding extent of fitting, fitting between the inner circumferential surface 85 of the holding portion 84 and the second outer circumferential surface 54 of the electric motor 50 may be either gap fitting (relative rotation possible) or press fitting (relative rotation impossible).

The outer lid 87 has a circular plate shape centered on the axis L. A front end surface 87a of the outer lid 87 is overlapped with a rear end surface 82b of the main body portion 82 of the inner lid 81. The harness 59 of the electric motor 50 penetrates the inner lid 81 and the outer lid 87. The main body portion 82 of the inner lid 81 has an inner support hole 83 which supports the penetrating harness 59. The outer lid 87 has an outer support hole 88 which supports the penetrating harness 59. A gap between the outer support hole 88 of the outer lid 87 and the harness 59 is closed by an annular seal member 89.

(Stopper)

A first groove 62a along a circumferential direction of the first cylinder 60 is formed on the second inner circumferential surface 62 of the first cylinder 60. An annular stopper 90 is fitted into the first groove 62a of the first cylinder 60 to prevent the outer lid 87 from coming off the first cylinder 60. A diameter of the inner circumferential surface 91 of the stopper 90 is smaller than the diameter of the second inner circumferential surface 62 of the first cylinder 60. Accordingly, the stopper 90 can restrict the movement of the outer lid 87 in the axial direction.

(Elastic Member)

The second inner circumferential surface 62 of the first cylinder 60, the first step surface 63 of the first cylinder 60, the second step surface 55 of the electric motor 50, the second outer circumferential surface 54 of the electric motor 50, and an end surface 86 of the holding portion 84 of the inner lid 81 define an annular space. An annular elastic member 93 is disposed in the annular space. The elastic member 93 is compressed in the axial direction of the electric motor 50. Further, the elastic member 93 is compressed in the radial direction of the electric motor 50.

Effects of First Embodiment

The annular elastic member 93 is compressed in the radial direction of the electric motor 50 by the second outer circumferential surface 54 of the electric motor 50 and the second inner circumferential surface 62 of the first cylinder 60. Therefore, a restoring force F1 acting in the radial direction of the electric motor 50 is generated in the elastic member 93. The restoring force F1 of the elastic member 93 acts on the second outer circumferential surface 54 of the electric motor 50 so as to reduce the diameter thereof. The electric motor 50 is held by the restoring force F1.

In addition, the annular elastic member 93 is compressed in the axial direction of the electric motor 50 by the first step surface 63 of the first cylinder 60, the second step surface 55 of the electric motor 50, and the end surface 86 of the holding portion 84 of the inner lid 81. Therefore, a restoring force F2 acting in the axial direction of the electric motor 50 is generated in the elastic member 93. The restoring force F2 of the elastic member 93 acts to press the end surface 86 of the holding portion 84 of the inner lid 81. The restoring force F2 prevents the inner lid 81 from rotating about the axis L.

Summarizing the above, rattling of the electric motor 50 in the radial direction can be prevented by the restoring force F1. Further, the restoring force F2 prevents the inner lid 81 from rotating about the axis L. The durability of the fluid supply device 40 can be improved.

In addition, the gap between the outer support hole 88 of the outer lid 87 and the harness 59 is closed by the annular seal member 89. The entry of dust and a liquid matter from the outside can be prevented.

Second Embodiment

Figure 4:
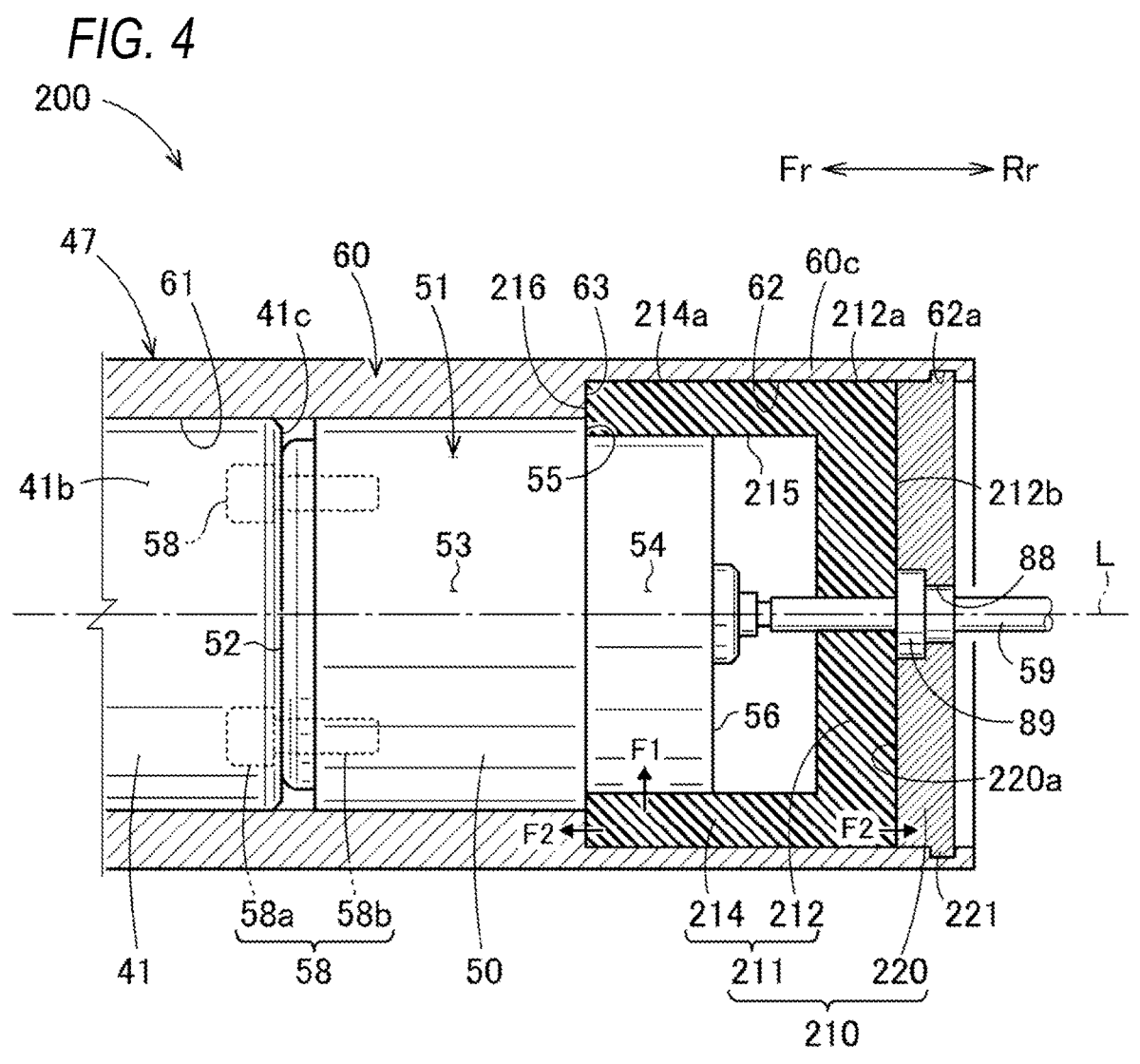

FIG. 4 illustrates a fluid supply device 200 according to a second embodiment. Description of configurations and effects common to those of the first embodiment will be omitted.

A lid 210 includes an inner lid 211 disposed to hold the case 51, and an outer lid 220 covering the inner lid 211. The inner lid 211 is made of an elastic material. The inner lid 211 is disposed inside the first cylinder 60 in a compressed manner. The inner lid 211 includes a main body portion 212 having a circular plate shape centered on the axis L, and a cylindrical holding portion 214 which extends from an outer circumferential edge of the main body portion 212 toward the electric motor side (front side) and holds the electric motor 50. The main body portion 212 and the holding portion 214 are integrally formed.

An outer circumferential surface 212a of the main body portion 212 is in contact with the second inner circumferential surface 62 of the first cylinder 60 over a circumference thereof. An outer circumferential surface 214a of the holding portion 214 is in contact with the second inner circumferential surface 62 of the first cylinder 60 over a circumference thereof. An inner circumferential surface 215 of the holding portion 214 is in contact with the second outer circumferential surface 54 of the electric motor 50 over a circumference thereof.

An end surface 216 of the holding portion 214 is in contact with the first step surface 63 of the first cylinder 60 and the second step surface 55 of the electric motor 50. (Lid and Stopper)

A front end surface 220a of the outer lid 220 is overlapped with a rear end surface 212b of the main body portion 212 of the inner lid 211. The outer lid 220 includes a diameter-expanded portion 221 formed by partially expanding a diameter of a part of an outer circumferential surface thereof. The diameter-expanded portion 221 is fitted into the first groove 62. That is, the outer lid 220 also has the function of the annular stopper 90 in the first embodiment which prevents the outer lid 87 from coming off the first cylinder 60. The outer lid 220 is made of a flexible material. The deformed outer lid 220 can be attached to the first cylinder 60.

Effects of Second Embodiment

The inner circumferential surface 215 of the holding portion 214 of the inner lid 211 is in contact with the second outer circumferential surface 54 of the electric motor 50 over the circumference thereof. The outer circumferential surface 214a of the holding portion 214 of the inner lid 211 is in contact with the second inner circumferential surface 62 of the first cylinder 60 over the circumference thereof. The inner lid 211 is made of an elastic material.

That is, the holding portion 214 of the inner lid 211 is compressed in the radial direction of the electric motor 50 by the second outer circumferential surface 54 of the electric motor 50 and the second inner circumferential surface 62 of the first cylinder 60. The restoring force F1 acting in the radial direction of the electric motor 50 is generated in the holding portion 214 of the inner lid 211. The restoring force F1 of the inner lid 211 which is an elastic member acts on the second outer circumferential surface 54 of the electric motor 50 so as to reduce the diameter thereof. The electric motor 50 is held by the restoring force F1.

The end surface 216 of the holding portion 214 of the inner lid 211 is in contact with the first step surface 63 of the first cylinder 60 and the second step surface 55 of the electric motor 50. The rear end surface 212b of the main body portion 212 of the inner lid 211 is in contact with the front end surface 220a of the outer lid 220. The inner lid 211 is made of an elastic material.

That is, the holding portion 214 of the inner lid 211 is compressed in the axial direction of the electric motor 50 by the step surface of the first cylinder 60 and the second step surface 55 of the electric motor 50 and the front end surface 220a of the outer lid 220. The restoring force F2 acting on the first step surface 63 of the first cylinder 60 and the second step surface 55 of the electric motor 50 in the axial direction of the electric motor 50 is generated. Similarly, the restoring force F2 is also generated for the front end surface 220a of the outer lid 220. The restoring force F2 of the inner lid 211, which is an elastic member, can prevent rotation of the inner lid 211.

Summarizing the above, rattling of the electric motor 50 in the radial direction can be prevented by the restoring force F1. Further, the restoring force F2 prevents the inner lid 211 from rotating about the axis L. The durability of the fluid supply device 200 can be improved.

In addition, in the fluid supply device 200 according to the second embodiment, since the inner lid 211 itself is made of an elastic material, the annular elastic member 93 (see FIG. 3) according to the first embodiment is not provided. Compared with the fluid supply device 40 according to the first embodiment, the number of components of the fluid supply device 200 can be reduced.

Third Embodiment

Figure 5:
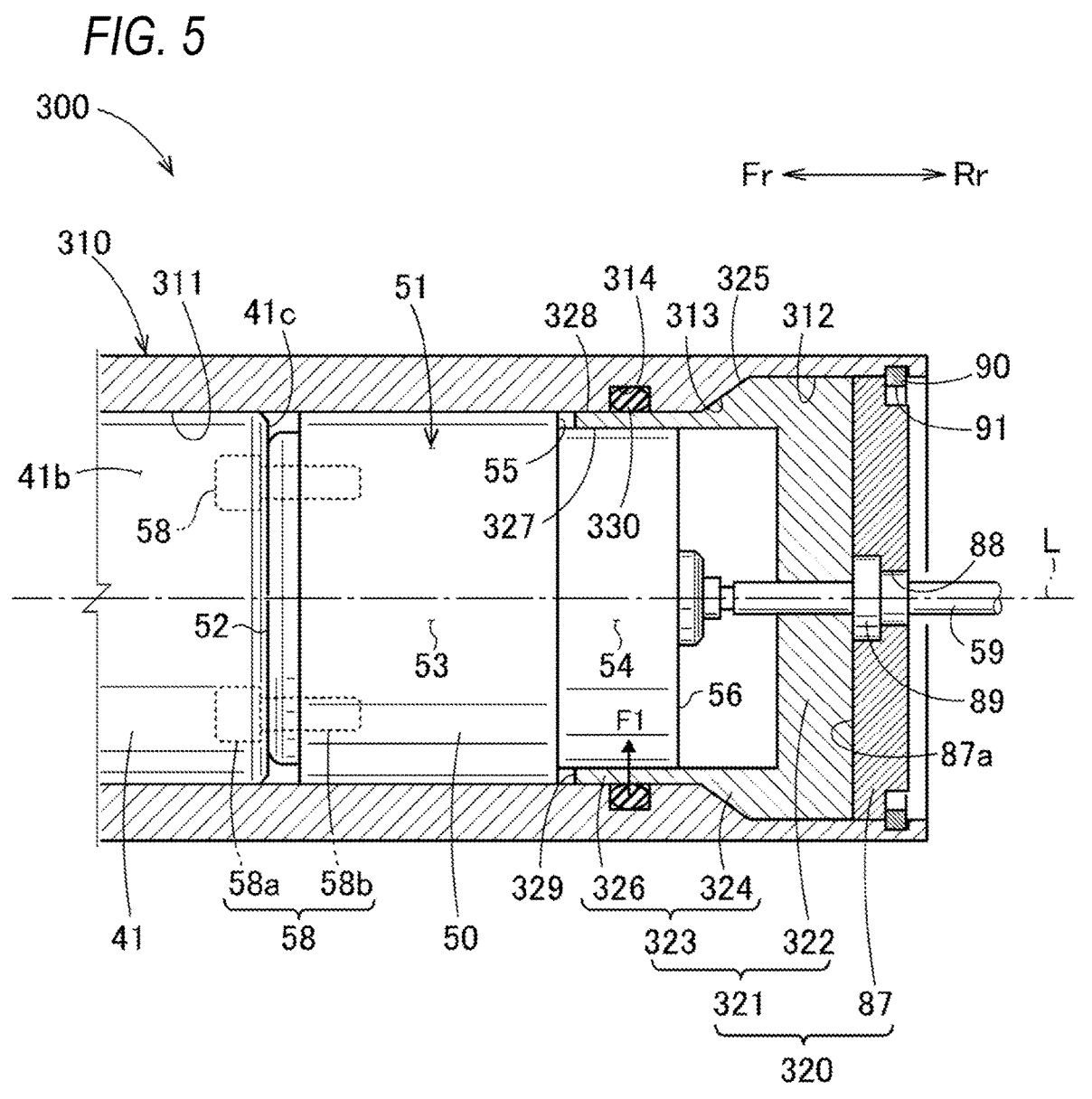

FIG. 5 illustrates a fluid supply device 300 according to a third embodiment. Description of configurations and effects common to those of the first embodiment will be omitted.

A first cylinder 310 includes a first inner circumferential surface 311 which is in contact with the outer circumferential surface 41b of speed reducer 41, a second inner circumferential surface 312 which is located rearward of the first inner circumferential surface 311 and has a larger diameter than the first inner circumferential surface 311, and a first connection surface 313 which connects the first inner circumferential surface 311 and the second inner circumferential surface 312. The first connection surface 313 is inclined such that a diameter thereof decreases from the second inner circumferential surface 312 toward the first inner circumferential surface 311.

An inner lid 321 of a lid 320 includes a main body portion 322 having a circular plate shape centered on the axis L, and a cylindrical holding portion 323 which extends from an outer circumferential edge of the main body portion 322 toward the electric motor 50 side (front side) and holds the electric motor 50. The main body portion 322 and the holding portion 323 are integrally formed.

The holding portion 323 includes a base portion 324 whose thickness decreases toward the electric motor 50 side (front side), and a thin wall portion 326 located on a front side of the base portion 324 and having a smaller thickness than the base portion 324. An outer circumferential surface 325 of the base portion 324 is in contact with the first connection surface 313 of the first cylinder 310 over a circumference thereof. An outer circumferential surface 328 of the thin wall portion 326 is in contact with the first inner circumferential surface 311 of the first cylinder 310 over a circumference thereof. An inner circumferential surface 327 of the thin wall portion 326 is in contact with the second outer circumferential surface 54 of the electric motor 50 over a circumference thereof.

A second groove 314 is formed in the first inner circumferential surface 311 of the first cylinder 310 in a circumferential direction of the first cylinder 310. An annular elastic member 330 is disposed in the second groove 314. The elastic member 330 is compressed in the radial direction of the electric motor 50 by a bottom surface of the second groove 314 and the outer circumferential surface 328 of the thin wall portion 326.

An end surface 329 of the thin wall portion 326 and the second step surface 55 of the electric motor 50 are separated from each other.

Effects of Third Embodiment

The elastic member 330 is compressed in the radial direction of the electric motor 50 by a bottom surface of the second groove 314 and the outer circumferential surface 328 of the thin wall portion 326. Therefore, the restoring force F1 acting in the radial direction of the electric motor 50 is generated in the elastic member 330. Since the restoring force F1 acts in a direction of reducing a diameter of the thin wall portion 326, it is possible to prevent rotation of the inner lid 321 including the thin wall portion 326.

Compared with the holding portion 84 (FIG. 3) according to the first embodiment, the holding portion 323 according to the third embodiment includes the thin wall portion 326. Therefore, the thin wall portion 326 is easily deflected so as to be reduced in diameter. The restoring force F1 reinforces a force of the thin wall portion 326 of the lid 320 holding the electric motor 50. In order to easily deflect the thin wall portion 326, for example, a slit extending in the axial direction of the electric motor 50 may be formed in the thin wall portion 326.

Summarizing the above, rattling of the electric motor 50 in the radial direction can be prevented by the restoring force F1. Further, the restoring force F1 can prevent the inner lid 321 from rotating about the axis L. The durability of the fluid supply device 300 can be improved.

A restoring force in the axial direction of the electric motor 50 is not applied to the inner lid 321. The end surface 329 of the thin wall portion 326 is separated from the second step surface 55 of the electric motor 50. Regarding a dimension of the inner lid 321 in the direction of the axis L, high accuracy is not required, and thus design and manufacturing are facilitated.

The present invention is not limited to the first to third embodiments as long as the operations and effects of the present invention can be obtained.

INDUSTRIAL APPLICABILITY

The fluid supply device of the present invention is suitable for a saddle-ride type vehicle such as a two-wheeled motor vehicle or a three-wheeled motor vehicle.

The invention claimed is:

1. A fluid supply device comprising:
an electric motor serving as a driving source for supplying a fluid to an outside;
an exterior case having a cylindrical shape and configured to accommodate the electric motor;
a fixing member configured to fix the electric motor to be able to prevent movement of the electric motor in an axial direction of the electric motor inside the exterior case;
a harness connected to the electric motor and configured to supply electricity;
a lid comprising: an inner lid which is fitted to an inner circumferential surface of the exterior case to close an end portion of the exterior case, supports the harness extending from the electric motor to an outer side of the exterior case, and includes a holding portion having a cylindrical shape and holding an outer circumferential surface of the electric motor over a circumference thereof; and an outer lid which covers at least a part of an end portion, at a side opposite to a side where the electric motor is provided in the axial direction, of the inner lid; and
a stopper configured to prevent coming-off of the lid from the exterior case, wherein:
an elastic member, which has an annular shape, is disposed in a compressed manner between the outer circumferential surface of the electric motor and the inner circumferential surface of the exterior case;
the elastic member is compressed to apply a restoring force to the electric motor in a radial direction of the electric motor, and apply a restoring force to the outer lid of the lid; and
the elastic member is the inner lid made of an elastic material.

2. The fluid supply device according to claim 1, wherein the stopper is formed integrally with the lid.

3. The fluid supply device according to claim 2, wherein a seal member is disposed to close a gap between the harness and the lid.

4. The fluid supply device according to claim 1, wherein a seal member is disposed to close a gap between the harness and the lid.

5. A fluid supply device comprising:
an electric motor serving as a driving source for supplying a fluid to an outside;
an exterior case having a cylindrical shape and configured to accommodate the electric motor;
a fixing member configured to fix the electric motor to be able to prevent movement of the electric motor in an axial direction of the electric motor inside the exterior case;
a harness connected to the electric motor and configured to supply electricity;
a lid which is fitted to an inner circumferential surface of the exterior case to close an end portion of the exterior case, supports the harness extending from the electric motor to an outer side of the exterior case, and includes a holding portion having a cylindrical shape and holding an outer circumferential surface of the electric motor over a circumference thereof; and
a stopper configured to prevent coming-off of the lid from the exterior case, wherein:
an elastic member, which has an annular shape, is disposed in a compressed manner between the outer circumferential surface of the electric motor and the inner circumferential surface of the exterior case;

the elastic member is compressed to apply a restoring force to the electric motor in a radial direction of the electric motor, and apply a restoring force to the holding portion of the lid;

an outer circumferential surface of the holding portion of the lid and the inner circumferential surface of the exterior case compress the elastic member; and the elastic member applies a force to the holding portion of the lid in the radial direction.

6. The fluid supply device according to claim 5, wherein the stopper is formed integrally with the lid.

7. The fluid supply device according to claim 5, wherein a seal member is disposed to close a gap between the harness and the lid.

8. A fluid supply device comprising:

an electric motor serving as a driving source for supplying a fluid to an outside;

an exterior case having cylindrical-shaped and configured to accommodate the electric motor;

a fixing member configured to fix the electric motor to be able to prevent movement of the electric motor in an axial direction of the electric motor inside the exterior case;

a harness connected to the electric motor and configured to supply electricity;

a lid which is fitted to an inner circumferential surface of the exterior case to close an end portion of the exterior case, supports the harness extending from the electric motor to an outer side of the exterior case, and includes a holding portion having cylindrical-shaped and holding an outer circumferential surface of the electric motor over a circumference thereof; and a stopper configured to prevent coming-off of the lid from the exterior case, wherein:

an elastic member, which has annular-shaped, is disposed in a compressed manner between the outer circumferential surface of the electric motor and the inner circumferential surface of the exterior; and the elastic member is compressed to apply a restoring force to the electric motor in a radial direction of the electric motor, and apply a restoring force to the holding portion of the lid.

\* \* \* \* \*